United States Patent
Kim (10) Patent No.: US 10,859,002 B2
(45) Date of Patent: Dec. 8, 2020

(54) METHOD FOR CONTROLLING SURGE MARGIN OF GAS TURBINE AND EXTRACTION DEVICE FOR GAS TURBINE

(71) Applicant: DOOSAN HEAVY INDUSTRIES & CONSTRUCTION CO., LTD., Changwon-si (KR)

(72) Inventor: Sang Jo Kim, Gimhae-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 355 days.

(21) Appl. No.: 15/877,392

(22) Filed: Jan. 23, 2018

(65) Prior Publication Data

US 2018/0209351 A1    Jul. 26, 2018

(30) Foreign Application Priority Data

Jan. 23, 2017 (KR) .................. 10-2017-0010387

(51) Int. Cl.
*F02C 9/18* (2006.01)
*F04D 27/02* (2006.01)
(Continued)

(52) U.S. Cl.
CPC .................. *F02C 9/18* (2013.01); *F02C 7/18* (2013.01); *F02C 9/28* (2013.01); *F04D 27/023* (2013.01); *F04D 27/0215* (2013.01); *F04D 27/0223* (2013.01); *F05D 2220/3216* (2013.01); *F05D 2220/3217* (2013.01);
(Continued)

(58) Field of Classification Search
CPC .. F05D 2270/101; F04D 27/02; F04D 27/023; F04D 27/0207; F02C 6/08; F02C 9/18; F02C 9/28; F02C 7/12; F02C 7/141; F02C 7/18
See application file for complete search history.

(56) References Cited

U.S. PATENT DOCUMENTS 5,261,228 A * 11/1993 Shuba .................. F01D 17/105
                                                         60/226.3
5,599,161 A    2/1997 Batson
(Continued)

FOREIGN PATENT DOCUMENTS

EP    2292909 A2    3/2011
JP    2002-61594 A    2/2002
(Continued)

OTHER PUBLICATIONS

European Search Report dated May 24, 2018 in corresponding European Patent Application No. 18152861.3.
(Continued)

*Primary Examiner* — Todd E Manahan
*Assistant Examiner* — Thuyhang N Nguyen
(74) *Attorney, Agent, or Firm* — Invenstone Patent, LLC (57) ABSTRACT

Disclosed herein is a method for controlling a surge margin of a gas turbine and an extraction device for a gas turbine. The method for controlling the surge margin of the gas turbine and the extraction device for the gas turbine may support stable operation of a compressor unit in the gas turbine, thereby improving the efficiency of the gas turbine and minimizing vibration and noise of the gas turbine.

10 Claims, 5 Drawing Sheets

(51) Int. Cl.
*F02C 9/28* (2006.01)
*F02C 7/18* (2006.01)

(52) U.S. Cl.
CPC .. *F05D 2260/606* (2013.01); *F05D 2270/101* (2013.01); *F05D 2270/304* (2013.01)

(56) References Cited

U.S. PATENT DOCUMENTS

| | | | | |
|---|---|---|---|---|
| 6,059,522 | A * | 5/2000 | Gertz | F02C 7/057 415/1 |
| 8,973,373 | B2 * | 3/2015 | Arar | F02C 9/18 60/785 |
| 2015/0354464 | A1 * | 12/2015 | Hillel | F02C 3/04 415/1 |

FOREIGN PATENT DOCUMENTS

| | | |
|---|---|---|
| JP | 4220631 B | 2/2009 |
| JP | 2011-058494 A | 3/2011 |
| JP | 2016-527429 A | 9/2016 |
| WO | 0127452 A1 | 4/2001 |

OTHER PUBLICATIONS

A Japanese Office Action dated Jan. 15, 2019 in connection with Japanese Patent Application No. 2018-008588 which corresponds to the above-referenced U.S. application.

* cited by examiner

METHOD FOR CONTROLLING SURGE MARGIN OF GAS TURBINE AND EXTRACTION DEVICE FOR GAS TURBINE

CROSS-REFERENCE(S) TO RELATED APPLICATIONS

This application claims priority to Korean Patent Application No. 10-2017-0010387, filed on Jan. 23, 2017 the disclosure of which is incorporated herein by reference in its entirety.

BACKGROUND OF THE DISCLOSURE

Field of the Disclosure

Exemplary embodiments of the present disclosure relate to a method for controlling a surge margin of a gas turbine and an extraction device for the gas turbine, which are capable of minimizing vibration noise and flow instability caused by a surge in the gas turbine comprising a plurality of compressor stages, such that a compressor unit may be stably driven.

Description of the Related Art

In general, an engine or device comprising a turbine such as a gas turbine or steam turbine is referred to as a turbo machine. The turbo machine is a power generation device for converting thermal energy of fluid into a rotational force as mechanical energy, and comprises a rotor which is axially rotated by fluid and a stator which supports and surrounds the rotor.

For example, the gas turbine comprises a combustor for producing combustion gas, a turbine driven by the combustion gas discharged from the combustor, and a compressor for supplying high-pressure air to the combustor. The compressor is rotated to suck and compress external air, and supplies the compressed air to the combustor. The combustor supplies fuel to the compressed air, combusts the fuel mixture to generate high-temperature high-pressure combustion gas, and supplies the generated combustion gas to the turbine.

The high-temperature high-pressure combustion gas discharged from the combustor drives moving blades of the turbine, thereby rotating the rotor of the turbine. The turbine comprises a plurality of turbine disk units such as moving blades and stationary blades, which are alternately installed in multi-stages along the axial direction of the rotor. Various efforts have been made to improve the efficiency of the gas turbine.

SUMMARY OF THE DISCLOSURE

When the gas turbine is started, the air is compressed by a plurality of compressor stages constituting the compressor. In this case, when any one of the compressor stages located at the initial stage among the plurality of compressor stages has an abnormal pressure ratio, a surge may occur to cause a shock and noise. The surge is caused by a difference between the angle at which the compressor blades are installed and the angle at which the compressed air is supplied toward the compressor blades. Conventionally, various efforts have been made to delay a surge which occurs in the compressor stages. In most cases, however, the surge delay is controlled in the entire compressor stages, based on pressure. Thus, the surge delay may not be efficiently controlled.

The present disclosure has been made in view of the above problems, and it is an object of the present disclosure to provide a technique for performing extraction control for the initial compressor stage among the plurality of compressor stages installed in the gas turbine, suppressing a vibration noise and shock caused by a surge, and supporting stable operation of the compressor unit, thereby improving the efficiency of the gas turbine.

Other objects and advantages of the present disclosure may be understood by the following description, and become apparent with reference to the embodiments of the present disclosure. Also, it is obvious to those skilled in the art to which the present disclosure pertains that the objects and advantages of the present disclosure may be realized by the means as claimed and combinations thereof.

In accordance with one aspect of the present disclosure, a method for controlling a surge margin of a gas turbine may comprise: determining the number of revolutions and the pressure ratios of compressors located at the initial stage among a plurality of compressor stages installed in a compressor unit of the gas turbine; and controlling a surge margin by extracting compressed air from each of the compressor stages to a turbine, when the surge margin at the initial compressor stage does not satisfy a reference margin.

The controlling of the surge margin may comprise a first extraction step of extracting the compressed air from a first compressor in which compression is initially performed. In the first extraction step, the amount of extracted air supplied to the turbine may increase or decrease depending on a state of the surge margin. The controlling of the surge margin may further comprise a second extraction step of additionally extracting the compressed air from a neighboring compressor stage located at the next stage of the first compressor, when the surge margin is not stabilized after the first extraction step. In the second extraction step, the amount of extracted air supplied to the turbine may increase or decrease depending on the state of the surge margin.

The controlling of the surge margin may further comprise a third extraction step of additionally extracting the compressed air from the next compressor stage, when the surge margin is not stabilized after the first and second extraction steps. In the third extraction step, the amount of extracted air supplied to the turbine may increase or decrease depending on the state of the surge margin. The method may further comprise stopping the operation of the gas turbine when the surge margin is not secured after the third extraction step.

In accordance with another aspect of the present disclosure, an extraction device of a gas turbine may comprise: a sensor unit configured to sense the number of revolutions and the pressure ratios of compressors located at the initial stage among a plurality of compressor stages installed in a compressor unit of the gas turbine; an extraction pipe having one end connected to the circumference of a compressor housing and the other end extended to a turbine, the compressor housing surrounding the compressor stages located at the initial stage; a valve unit installed on the extraction pipe; and a control unit configured to control an opening degree of the valve unit according to a value sensed by the sensor unit.

The extraction pipe may be coupled to each of the compressor stages. The extraction pipe may comprise: a plurality of branch pipes each having one end inserted into the compressor housing in the circumferential direction of the compressor housing, and arranged at even intervals; and a main pipe formed as a single pipe by the branch pipes which are extended to the outside of the compressor housing and then join each other.

The branch pipes may be arranged symmetrically in the top-to-bottom and side-to-side directions of the compressor housing. The branch pipes may have a larger diameter than the main pipe. The valve unit may be mounted on each of the branch pipes extended from the respective compressor stages.

The control unit may sequentially control opening degrees of the valve units from the initial compressor stage among the plurality of compressor stages. The control unit may open the valve units corresponding to the initial compressor stage and the next compressor stage, when the initial compressor stage among the compressor stages is normal and the next compressor stage adjacent to the initial compressor stage is abnormal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereafter, a method for controlling a surge margin of a gas turbine according to an embodiment of the present disclosure will be described with reference to the accompanying drawings.

Figure 1:
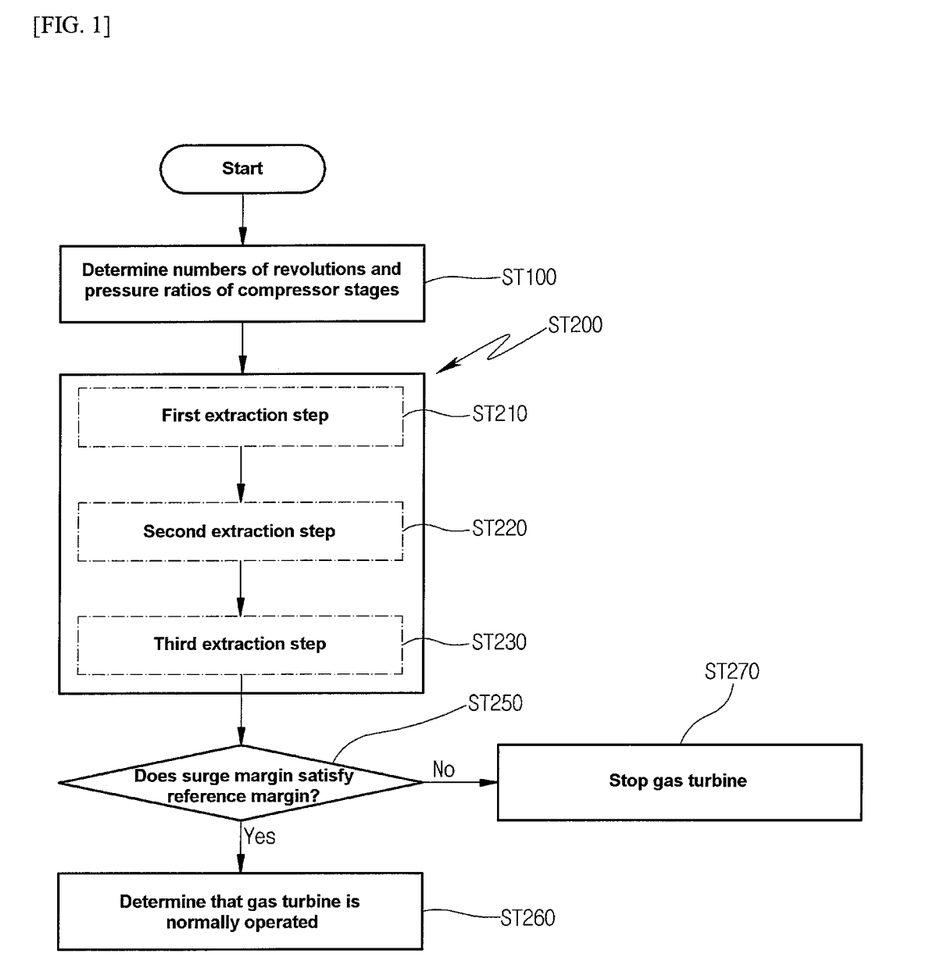
FIG. 1 is a flowchart illustrating a method for controlling a surge margin of a gas turbine according to an embodiment of the present disclosure.
Figure 3:
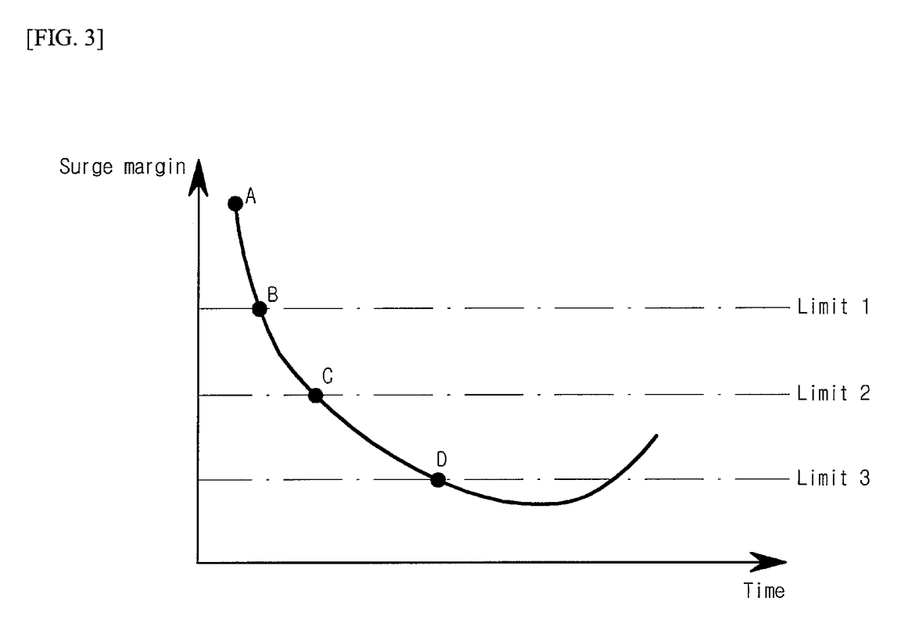
FIG. 3 is a graph illustrating the surge margin with time in the method for controlling the surge margin of the gas turbine according to an embodiment of the present disclosure.

Referring to FIG. 1 or 3, the method for controlling the surge margin of the gas turbine according to the present embodiment is configured to secure the stability of a compressor unit of the gas turbine during a start-up period of a multi-stage axial compressor.

The method for controlling the surge margin of the gas turbine according to the present embodiment comprises: determining the numbers of revolutions and the pressure ratios of compressor stages located at the initial stage among a plurality of compressor stages installed in the compressor unit of the gas turbine at step ST100; and controlling the surge margin by extracting compressed air from each of the compressor stages to the turbine, when the surge margin does not satisfy a reference margin at the initial stage at step ST200.

In order to determine the numbers of revolutions and the pressure ratios of the unit compressors at step ST100, the numbers of revolutions and the pressure ratios of the unit compressors constituting the compressor unit need to be sensed. In the multi-stage compressor, pairs of compressor blades and compressor vanes are installed along the axial direction of the gas turbine, and defined as the compressor stages. For example, the plurality of compressor stages may be arranged in the compressor unit, ranging from 10 stages to 20 stages. The compressor unit is designed to have a specific ratio of inlet air pressure and outlet air pressure at each of the compressor stages. When the number of revolutions or the pressure ratio of a specific compressor stage is different from a preset design value, a surge may occur due to flow instability of the compressed air or collision of the compressor air with the compressor blades, thereby causing a vibration noise in the compressor unit.

In the present embodiment, in order to minimize a surge, the method comprises determining whether the numbers of revolutions and the pressure ratios of the compressor stages located at the initial stage among the plurality of compressor stages constituting the compressor unit are normal. The numbers of revolutions of the compressor stages may be sensed by an RPM sensor or another type of sensor having a similar function, and the pressure ratios of the compressor stages may be sensed by a pressure sensor.

When a surge occurs in the compressor stages located at the initial stage, a surge margin is controlled by extracting the compressed air from each of the compressor stages to the turbine, at step ST200. In the present embodiment, when the number of revolutions or the pressure ratio of the first compressor in which the compression is initially performed is abnormal, a first extraction step ST210 is performed. At the first extraction step ST210, the amount of extracted air supplied to the turbine is increased or decreased depending on the surge margin. For example, the first extraction step ST210 will be described with reference to a graph showing a surge margin with time, as illustrated in FIG. 3. At the first extraction step ST210, the operation of the compressor unit may not be maintained at position A in the graph of FIG. 3, and the trace of the graph may be moved downward toward position B as the time elapses.

Figure 4:
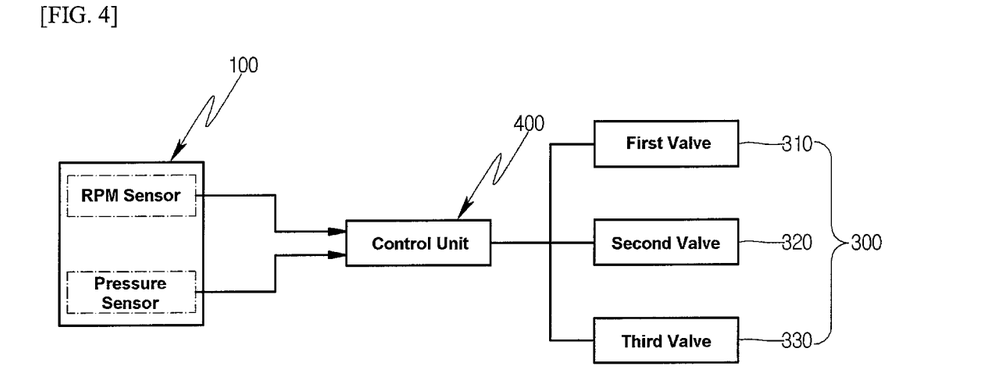
FIG. 4 illustrates a control unit and components connected to the control unit according to an embodiment of the present disclosure.

For example, when the trace of the graph moves downward from position A and reaches position B, it may be determined that a surge occurred at the initial compressor stage. Dotted lines illustrated in FIG. 3 indicate limits 1 to 3 for stable operation of the compressor unit, which are required at positions B to D, during which the vibration or noise is minimized. In this case, when the extraction of compressed air to the turbine is performed in the initial compressor stage, a first valve 310 of FIG. 4 is opened at position B of the graph. When an opening degree of the first valve 310 is regulated to a specific degree, the vibration and noise are reduced in the initial compressor stage. At this time, since a surge margin of the initial compressor stage is reduced, an output reduction of the gas turbine may be minimized.

As a reference, when the first valve 310 is closed, the trace of the graph may be slightly moved toward position A from position B.

In the present disclosure, when the first extraction step ST210 is performed, the first valve 310 is not completely opened or closed, but the amount of extracted air supplied to the turbine may be controlled in proportion to time, in consideration of the stability of the compressor unit and the efficiency of the gas turbine. The proportional control may indicate that the opening degrees of the first valve 310, a second valve 320, and a third valve 330, which will be described later, are regulated to increase or decrease the amount of extracted air in accordance with time. Therefore, during the operation of the gas turbine, an occurrence of shock in compressor blades installed in the initial compressor stage may be reduced, and the flow instability of the compressed air may be reduced.

The controlling of the surge margin by extracting the compressed air from each of the compressor stages to the turbine further comprises a second extraction step ST220 in which a neighboring compressor stage located at the next stage of the first compressor additionally performs extraction, when the surge margin is not stabilized after the first extraction step ST210. At the second extraction step ST220, the amount of extracted air supplied to the turbine is increased or decreased depending on the state of the surge margin. Desirably, however, the surge margin which occurred in the first compressor may be stabilized after the first extraction step ST210.

If the surge margin is not stabilized after the first extraction step ST210 but the number of revolutions or the pressure ratio is continuously increased, the surge margin decreases while the trace of the graph is moved from position B to position C. In this case, the valve may not be completely opened or closed at position C, but the amount of extracted air supplied to the turbine may be controlled in proportion to time in consideration of the stability of the compressor unit and the efficiency of the gas turbine. Therefore, during the operation of the gas turbine, an occurrence of shock in the compressor blades installed in the initial compressor stage may be reduced, the flow instability of the compressed air may be decreased, vibration and noise in the compressor unit may be reduced, and an output reduction of the gas turbine may be minimized.

In the present embodiment, the first extraction step ST210 and the second extraction step ST220 are sequentially performed depending on the surge margin in the compressor unit. If the surge margin in the compressor unit does not satisfy the reference margin even after the first and second extraction steps, a third extraction step ST230 is performed in order to additionally perform extraction through the next compressor stage. At the third extraction step ST230, when the number of revolutions or the pressure ratio is not stabilized after the first and second extraction steps ST210 and ST220 but continuously increased, the surge margin is increased while the trace of the graph is moved from position C to position D.

In this case, the valve is not completely opened or closed at position D, but the amount of extracted air supplied to the turbine may be controlled in proportion to time in consideration of the stability of the compressor unit and the efficiency of the gas turbine. Therefore, during the operation of the gas turbine, an occurrence of shock in the compressor blades installed in the initial compressor stage may be reduced, the flow instability of the compressed air may be decreased, vibration and noise in the compressor unit may be reduced, and an output reduction of the gas turbine may be minimized.

When the surge margin is stabilized at step ST250 after the third extraction step ST230, it is determined at step ST260 that the gas turbine is normally operated. On the other hand, if the surge margin is not stabilized after the third extraction step ST230, the operation of the gas turbine may be stopped to prevent a breakdown or malfunction of the compressor unit at step ST270.

In the present embodiment, when the surge margin is not stabilized after the first extraction, the second extraction may be performed. Then, when the surge margin is not still stabilized, the third extraction may be performed for stable operation of the compressor unit. In this case, since the first to third extractions are sequentially performed, the efficiency of the gas turbine may be improved while the gas turbine is stably operated.

Hereafter, an extraction device of a gas turbine according to an embodiment of the present disclosure will be described with reference to the accompanying drawings.

Figure 2:
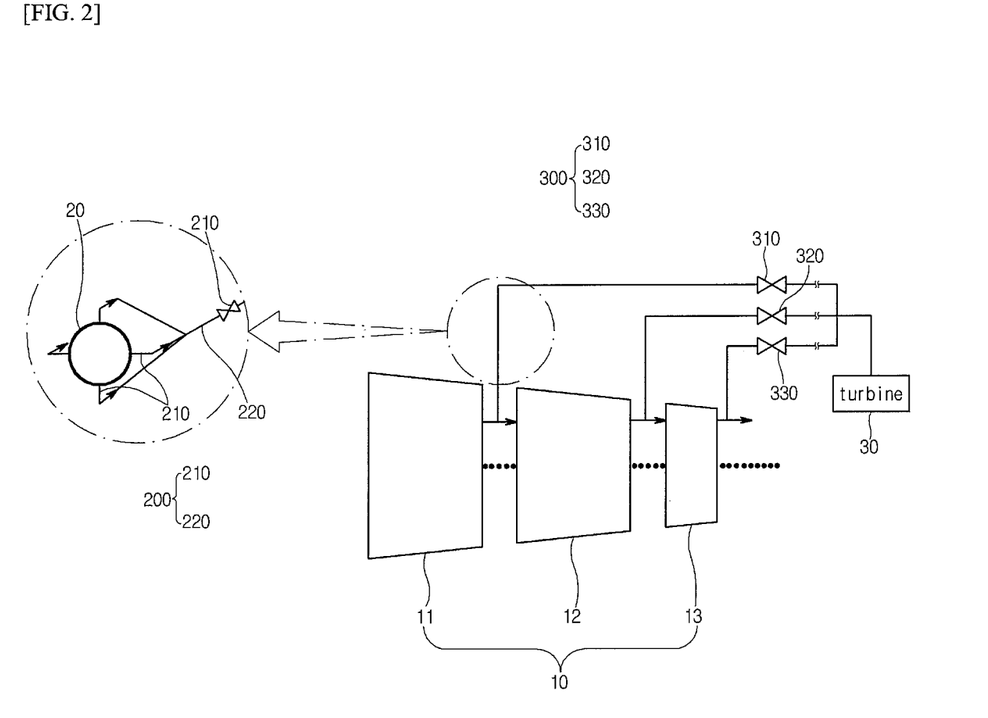
FIG. 2 illustrates the structure of an extraction device for the gas turbine according to an embodiment of the present disclosure.

In FIGS. 2 to 4, the extraction device of the gas turbine according to the present embodiment comprises a sensor unit 100, an extraction pipe 200, a valve unit 300 and a control unit 400. The sensor unit 100 senses the number of revolutions and the pressure ratios of compressor stages 11 to 13 located at the initial stage among a plurality of compressor stages installed in the compressor unit 10 of the gas turbine. One end of the extraction pipe 200 is connected to the circumference of a compressor housing 20 surrounding the plurality of compressor stages 11 to 13 at the initial stage, and the other end of the extraction pipe 200 is extended to the turbine. The valve unit 300 is installed on the extraction pipe 200. The control unit 400 controls an opening degree of the valve unit 300 according to the value sensed by the sensor unit 100.

The sensor unit 100 may comprise an RPM sensor configured to sense the numbers of revolutions of the compressor stages 11 to 13 and a pressure sensor configured to sense the pressure ratios. At this time, a different type of sensor having a similar function to the RPM sensor may be used. The extraction pipe 200 is coupled to each of the compressor stages 11 to 13, and comprises a plurality of branch pipes 210 and a main pipe 220, for example. The plurality of branch pipes 210 have their ends inserted into the compressor housing 20 in the circumferential direction of the compressor housing 20 and are arranged at even internals, and the main pipe 220 is formed as a single pipe by the branch pipes 210 which extend to outside of the compressor housing 20 and then join each other.

For example, when the compressor housing 20 is formed in a cylindrical shape, the branch pipes 210 may be located at the top and bottom positions facing each other, or located symmetrically in the top-to-bottom and side-to-side directions. The branch pipes 210 may have the same diameter, and are coupled to communicate with insides of the compressor stages 11 to 13. The branch pipes 210 extended toward the main pipe 220 may have the same length. However, the lengths of the branch pipes 210 may be different from each other depending on the layout.

When the main pipe 220 has the same diameter, the same flow rate of compressed air may be supplied to the turbine through the branch pipes 210 via the main pipe 220, depending on the opening degree of the valve unit 300. Therefore, even when the branch pipes 210 are located at different positions, a large amount of compressed air may be stably supplied to the turbine 30, which makes it possible to improve the supply stability.

The main pipe 220 according to the present embodiment is extended as a single pipe toward the turbine, after the plurality of branch pipes 210 join each other. The main pipe 220 comprises a first valve 310 constituting the valve unit 300, and has an opening degree controlled by the control unit 400. Since the branch pipe 210 has a larger diameter than the main pipe 220, the compressed air may be stably moved to the main pipe 220, and a problem caused by a pressure drop may be minimized while the compressed air is moved. The branch pipes 210 are installed in each of the compressor stages 11 to 13, and the main pipe 220 is connected to the branch pipes 210 extended from each of the compressor stages 11 to 13. Since the compressed air is not separately supplied to the turbine through the branch pipes 210 but supplied to the turbine through the main pipe 220 formed as the single pipe, the amount of extracted air supplied to the turbine is controlled depending on the opening degree of the valve unit 300.

The valve unit 300 according to the present embodiment is mounted on each of the branch pipes extended from the compressor stages 11 to 13, and comprises the first to third valves 310 to 330. All of the first to third valves 310 to 330 may be controlled by the control unit 400, and the amount of extracted air supplied to the turbine may be stably controlled through the control of the opening degree.

Figure 5:
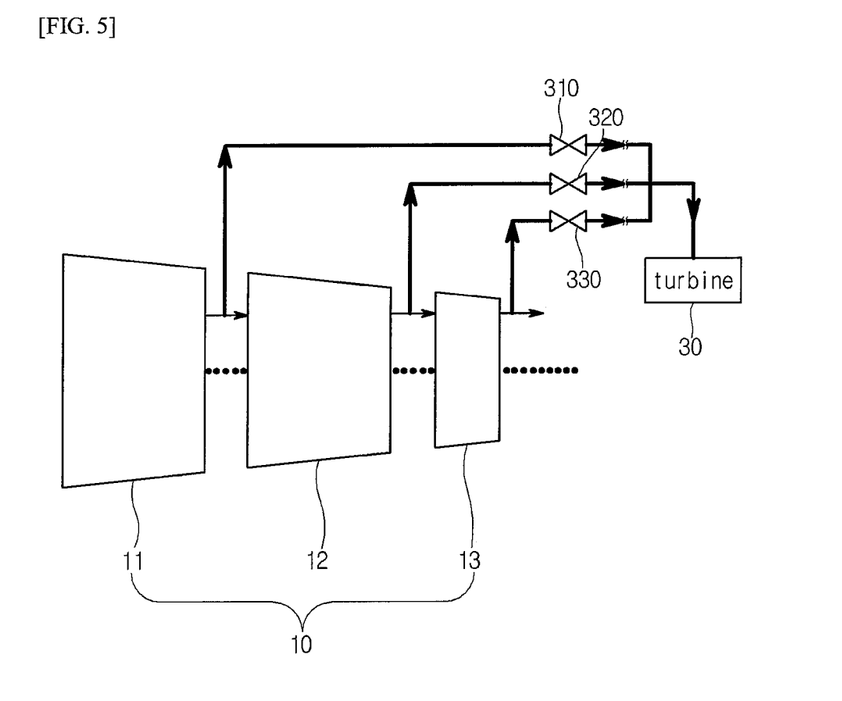
FIGS. 5 and 6 illustrate an operation state of the extraction device for the gas turbine according to an embodiment of the present disclosure.
Figure 6:
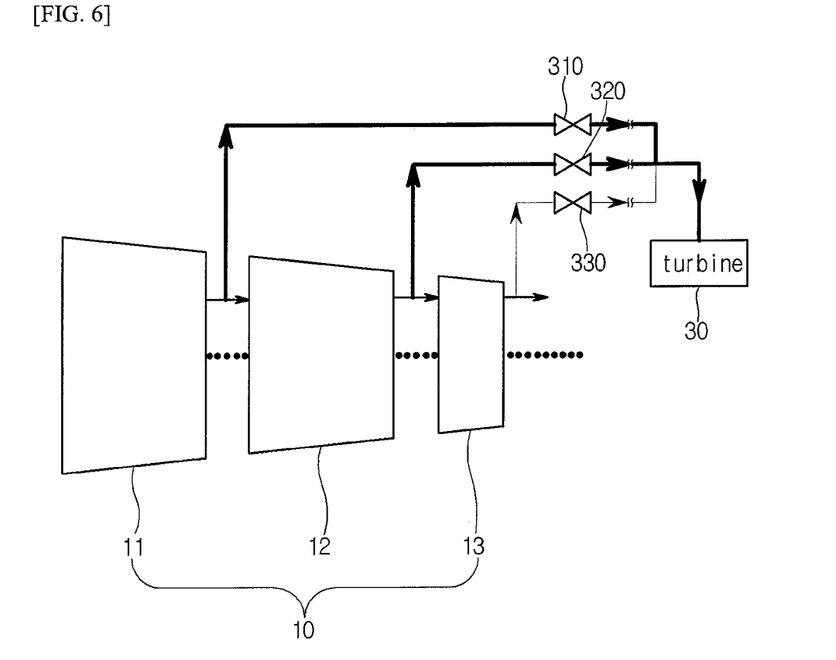

Referring to FIGS. 4 to 6, the control unit 400 according to the present embodiment sequentially controls the opening degrees of the first to third valves 310 to 330 comprised in the valve unit 300 from the initial compressor stage among the compressor stages 11 to 13. That is, the control unit 400 may first open the first valve 310 for the compressor stage 11, and then open the second valve 320 to extract the compressed air from the compressor stage 12 adjacent to the compressor stage 11. Then, when the control unit 400 opens the third valve 330 to extract the compressed air from the compressor stage 13, the compressed air may be supplied to the turbine 30. In this case, the high-pressure compressed air is moved along a path indicated by a thick solid line.

The control unit 400 according to the present embodiment may open both of the first and second valves 310 and 320 corresponding to the initial compressor stage 11 and the next compressor stage 12 when the initial compressor stage 11 of the compressor stages 11 to 13 is normal and the next compressor stage 12 adjacent to the initial compressor stage 11 is abnormal. In this case, since the extracted air is supplied to the turbine 30 along the path illustrated as a thick solid line, vibration and noise caused by a surge may be reduced, and the operation of the gas turbine may stably maintained.

According to the embodiments of the present disclosure, the number of revolutions and the pressure ratios of the compressor stages at the initial stage may be sensed. When the surge occurs, vibration and noise may be minimized by controlling the amount of extracted air. Furthermore, extraction control may be sequentially performed in the initial compressor stage, thereby securing the stability of the initial compressor stage. Moreover, the efficiency of the gas turbine may be improved. When the gas turbine is stopped for maintenance or repair and then restarted, the compressor stages may be stably operated.

While the present disclosure has been described with respect to the specific embodiments, it will be apparent to those skilled in the art that various changes and modifications may be made without departing from the spirit and scope of the disclosure as defined in the following claims.

What is claimed is:

1. An extraction device of a gas turbine comprising a turbine coupled to a compressor formed of a plurality of compressor stages, the plurality of compressor stages including a first stage of the compressor, the extraction device comprising:
   a controller;
   a sensor unit configured to sense a rotational speed and a pressure ratio of each of the plurality of compressor stages, the sensor unit outputting to the controller a value indicative of the respectively sensed rotational speeds and the respectively sensed pressure ratios;
   a compressor housing surrounding each of the plurality of compressor stages;
   each of the plurality of compressor stages including an extraction pipe, wherein each of the extraction pipes having a plurality of inlet portions respectively communicating with the compressor housing and an outlet portion communicating with the turbine, and
   wherein each of the plurality of inlet portions of the extraction pipe comprises a branch pipe having a first end inserted into the compressor housing and a second end that extends outside the compressor housing; and
   a plurality of valves respectively installed in the plurality of inlet portions of the extraction pipe, each of the plurality of valves configured to have an opening degree controlled by the controller according to the value sensed by the sensor unit.

2. The extraction device of claim 1, wherein the second ends of the branch pipes are joined with each other; and
   wherein each of the outlet portion of the extraction pipes comprises a main pipe formed as a single pipe having one end communicating with the second ends of the branch pipes.

3. The extraction device of claim 2, wherein the branch pipes each have a larger diameter than the main pipe.

4. The extraction device of claim 2, wherein the branch pipes are disposed at equal intervals around the compressor housing and separated from each other in a circumferential direction of the compressor housing.

5. The extraction device of claim 2, wherein the branch pipes are arranged symmetrically in a top-to-bottom direction and a side-to-side direction of the compressor housing.

6. The extraction device of claim 2, wherein the plurality of valves are respectively disposed between the first and second ends of each of the plurality of inlet portions.

7. The extraction device of claim 1, wherein the plurality of compressor stages include at least three compressor stages that are consecutively arranged beginning from the first stage of the compressor.

8. The extraction device of claim 7, wherein the controller is configured to control the opening degree of each of the plurality of valves sequentially beginning from the first stage of the compressor.

9. The extraction device of claim 7, wherein the controller is configured to open the plurality of valves corresponding to the first stage of the compressor and a next stage of the compressor, when the value outputted by the sensor unit indicates a normal operation of the first stage of the compressor and an abnormal operation of the next stage of the compressor.

10. The extraction device of claim 7, wherein the controller is configured to open the plurality of valves corresponding to the first stage of the compressor and a next stage of the compressor, when the value outputted by the sensor unit indicates a normal rotational speed and a normal pressure ratio of the first stage of the compressor and indicates either of an abnormal rotational speed or an abnormal pressure ratio of the next stage of the compressor.

* * * * *